United States Patent [19]
Levine et al.

[11] Patent Number: 5,745,681
[45] Date of Patent: Apr. 28, 1998

[54] STATELESS SHOPPING CART FOR THE WEB

[75] Inventors: Fredrick E. Levine, Boulder, Colo.; Bruce A. Carter, Los Angeles, Calif.

[73] Assignee: Sun Microsystems, Inc., Mountain View, Calif.

[21] Appl. No.: 583,877

[22] Filed: Jan. 11, 1996

[51] Int. Cl.⁶ .................. G06F 7/06; G06F 17/36
[52] U.S. Cl. .................. 395/200.3; 395/200.31; 395/200.43; 395/200.47; 395/200.49; 395/610; 395/200.33; 705/26; 705/27; 705/1; 705/21
[58] Field of Search .................. 395/200.01, 200.03, 395/200.08, 200.09, 201, 216, 220-222, 224, 226, 227-229, 610, 200.3, 200.31, 200.43, 200.47, 200.49, 200.33; 364/514 R, 514 A; 705/1, 16, 20-22, 24, 26, 27-29

[56] References Cited

U.S. PATENT DOCUMENTS

| | | | |
|---|---|---|---|
| 5,305,440 | 4/1994 | Morgan et al. | 395/200 |
| 5,500,929 | 3/1996 | Dickinson | 395/160 |
| 5,522,045 | 5/1996 | Sandberg | 395/200.08 |
| 5,572,643 | 11/1996 | Judson | 395/793 |
| 5,590,197 | 12/1996 | Chen et al. | 380/24 |
| 5,621,892 | 4/1997 | Cook | 395/200.1 |
| 5,623,589 | 4/1997 | Needham et al. | 395/160 |
| 5,623,656 | 4/1997 | Lyons | 395/610 |
| 5,625,781 | 4/1997 | Cline et al. | 395/335 |
| 5,630,068 | 5/1997 | Vela et al. | 395/201 |

OTHER PUBLICATIONS

Hauser, Ralf, et al., "Generic Extensions of WWW Browsers," Proceedings of the First USENIX Workshop on Electronic Commerce, New York, NY, Jul. 11-12, 1995, pp. 147-154.

Rowley, Jennifer, "Retailing and Shopping on the Internet," Internet Research, MCB University Press, UK, vol. 6, No. 1, 1996, ISSN 1066-2243, pp. 81-91.

Fried-Cassorla, Albert, "Successful Marketing on the Internet: A User's Guide," Direct Marketing, Feb. 1995, vol. 57, NO. 10, ISSN 0012-3188, pp. 23-26.

*Primary Examiner*—James P. Trammell
*Assistant Examiner*—Tuan Q. Dam
*Attorney, Agent, or Firm*—William J. Kubida; Homer L. Knearl; Holland & Hart LLP

[57] ABSTRACT

A shopping cart metaphor is emulated on a network of server and client computing systems. A browser at the client station has a request module to send a shopping page request to the server. A shopping page module in the server sends a shopping page file to the browser in response to the shopping page request. The shopping page file contains items selectable by a user using the browser. A shopping module at the browser generates an add request and sends the add request to the server. This add request contains selected items from the items that were selectable in the shopping page file. A receiver at the server receives the add request from the browser, and a cart list module at the server initializes a shopping cart list. An add module at the server adds the selected items to the shopping cart list. A shopping page module at the server converts the cart list to a cart field, generates a new shopping page file, embeds the cart field in the new shopping page file and sends the new shopping page file to the browser. In this way, the shopping cart field is in a shopping page file that may be managed by the browser at the client station.

21 Claims, 14 Drawing Sheets

```
<HTML>
<HEAD>
<TITLE>Driver Selection-MP Modules</TITLE>
</HEAD>
<BODY>
<A HREF="http://www.sun.com:80/navbar1.products-n-solutions.lightpurple.580x43">
<IMG SRC="/dx/navbar1.products-n-solutions.lightpurple.580x43.gif"></A>
<BR>
<A HREF="/cgi-bin/imagemap/navbr2.sunsoft-driverexpress.aqua580x35">
<IMG SCR="/dx/images/navbr2.sunsoft-driverexpress.aqua.580x35.gif"></A>

<FORM METHOD="POST" ACTION="/dx-cig-bin/dx.cgi">

Currently, you have <B>3 device drivers </B> in your collection.

<P>
<OL>
    <INPUT TYPE="submit" NAME= "which_button"
           VALUE="Review or doneload my collection">
</OL>
<P>
<HR>
<OL>

Select <B>MP module</B> drivers from this list and add
them to your collection:
```

*Fig. 7A*

```
<P>
<SELECT NAME="device" MULTIPLE SIZE=6>
    <OPTION VALUE="ALR PROVEISA">ALR PROVEISA
    <OPTION VALUE="AST Manhattan">AST Manhattan
    <OPTION VALUE="AST Manhattan P">AST Manhattan P
    <OPTION VALUE="AST Manhattan V">Ast Manhattan V
    <OPTION VALUE="ASUS Motherboard"">ASUA Motherboard
    <OPTION VALUE="Compaq ProLiant 1500">Compaq proLiant 1500
    <OPTION VALUE="Compaq Proliant 2000">Compaq Proliant 2000
    <OPTION VALUE="Compaq Proliant 4000">Compaq Proliant 4000
    <OPTION VALUE="Compaq Proliant 4500">Compaq Proliant 4500
    <OPTION VALUE="Compaq SysyemPro">Compaq SystemPro
    <OPTION VALUE="Compaq SystemPro/XL">Compaq SystemPro/XL
    <OPTION VALUE="Hitachi Flora 3100LP">Hitachi Flora 3100LP
    <OPTION VALUE="Intel XXpress">Intel XXpress
    <OPTION VALUE="Intel Xpress">Intel Xpress
    <OPTION VALUE="Intergraph ISMP-6">Intergraph ISMP-6
    <OPTION VALUE="Tricord Powerframe 5000">Tricord Powerframe 5000
    <OPTION VALUE="Wyse 7000i">Wyse 7000i
</SELECT>
</OL>
<OL>
<INPUT TYPE="submit" NAME= "which_button" VALUE="Add">
the selected drivers to my collection.<B>
<P>
<INPUT TYPE="submit" NAME= "which_button" VALUE="Disks">
```

```
<INPUT TYPE="submit" NAME= "which_button" VALUE="Networks">
<INPUT TYPE="submit" NAME= "which_button" VALUE="TAPES">
<INPUT TYPE="submit" NAME= "which_button" VALUE="Audio">
<INPUT TYPE="submit" NAME= "which_button" VALUE="Video">
<B> <TT> </TT>MP Modules <TT> </TT><B>
</OL>
<P>
or search for: <INPUT NAME="search" SIZE=35 VALUE="">

<INPUT TYPE="submit" NAME="which_button" VALUE="Search">

<INPUT TYPE="hidden" NAME="cart" VALUE="AT&T GIS NCR 53C15;> 252

<HR>

[ <A HREF="/dx/index.html">DriverExpress Home</A>
[ <A HREF="/dx/html/browse.html"> Driver Reference Information</A>
[ <A HREF="/dx/html/feedback.html"> Feedback</A>
[ <A HREF="/dx/html/help.html" Help</A>]

<P>

<H6 <A HREF="/dx/html/SMICopyright.html>Copyright<A>
© 1995 Sun Microsystems, Inc., 2550 Garcia Ave., Mtn.View, CA 94043-1100
USA. Allrights reserved. </H6>

</BODY>
</HTML>
```

*Fig. 7C*

STATELESS SHOPPING CART FOR THE WEB

BACKGROUND OF THE INVENTION

1. Field of the Invention

The present invention relates to a client computing station shopping across a network, such as the Internet, for items to be downloaded from a server computing system on the network. More particularly, the invention relates to the server handing off maintenance of a shopping cart metaphor to the client whereby the shopping process at the server is stateless, i.e. no maintenance of the shopping requests by the client.

2. Description of Prior Art

Typical database or file-based shopping cart systems require that the user be uniquely identified in order to associate particular data stored on the server with a particular user. This requires the user to log-in or create an account, which is then stored in the server. Each subsequent request from the user must reference the unique identifier, either in the uniform resource locator (URL) or as hidden data passed back through a form submission. Either of these approaches require that the account or ID information of the user be stored on the remote server in the network for some definite period of time. Usually, the user must keep track of the account identifier in order that the prior session information can be retrieved.

There is currently no reliable means to deduce the user's account information from the information accompanying a random request for a page. This is because many web servers, especially fire-walled servers, intentionally do not identify the sender in their data. When the remote server on the network serves the request from the user and stores the user's account information, this serving system must decide how long the data for an individual user will be stored.

In a resource constrained serving system, it is possible that a particular user's account information will be deleted before the user has completed the transaction. For example, a user might start a transaction in the evening, collect several items from the server and then retire for the night leaving the transaction open. Upon returning to the transaction process in the morning, the user is likely to find that the nightly administrative clean up at the remote server has assumed that all transactions were abandoned or completed and has therefore deleted the previous evening's collection of items.

SUMMARY OF THE INVENTION

In accordance with this invention, the above problems of prior shopping cart operations on networks, such as the Internet, have been solved by providing a stateless shopping cart operation at the server. In the stateless shopping cart operation, the server does not maintain a list of selected items for the shopping cart. Rather in each client transaction at the server, the server updates a data field identifying the contents of the shopping cart and sends the updated version of the shopping cart as a data field back to the client.

The stateless shopping cart process is triggered by command or request for a shopping page transmitted from a browser program at a client station to a computer-server. At the server, this request invokes a market application program at the server. In response to the transmitted command, the market program generates and transmits an shopping page file to the browser. The browser builds a shopping page from said shopping page file and sends to the server data strings corresponding to user selected items from the shopping page received and stored by the browser. The server determines if a list containing identification of items previously selected by said user exists, and if not, creates a list identifying items currently selected. This list is returned as a hidden "cart" field in a shopping page file to the browser. This interaction between browser at the client and market program at the server to transmit, receive, add items to the list and return a cart field to the browser continues until terminated by the browser requesting downloading selected items in the cart to the user client station.

The apparatus for emulating a shopping cart metaphor on a network of server and client computing systems has a request module in the browser to send a shopping page request to the server. A shopping page module in the server sends a shopping page file to the browser in response to the shopping page request. The shopping page file contains items selectable by a user using the browser. A shopping module at the browser generates an add request and sends the add request to the server. This add request contains selected items from the items that were selectable in the shopping page file. A receiver at the server receives the add request from the browser, and a cart list module at the server initializes a shopping cart list. An add module at the server adds the selected items to the shopping cart. A shopping page module at the server converts the cart list to a cart field, generates a new shopping page file, embeds the cart field in the new shopping page file and sends the new shopping page file to the browser. In this way, the shopping cart field is in a shopping page file that may be managed by the browser at the client station.

As a further feature of the invention, the shopping module at the browser generates an add request and sends the add request to the server. This add request contains current selected items from the items selectable in the new shopping page file and previously selected items in the cart field. The cart list module at the server converting the cart field of previously selected items to a cart list of previously selected items, and the add module adds the currently selected items from the add request to the cart list. Therefore, the cart list contains previously selected items and the current selected items.

As another feature of the invention the shopping page module has a convert-to-field module converting the cart list to the shopping cart field. This module also has a page file generator generating the shopping page file and embedding the shopping cart field in the shopping page file. The module then sends the shopping page file to the browser system.

The great utility of the invention is that the maintenance of the shopping cart, i.e. the cart field, is under the control of the user through the browser at the client station. The server has no responsibilities or burdens regarding maintenance of the shopping cart.

The foregoing and other features and advantages of the invention will be apparent from the following more particular description of a preferred embodiment of the invention as illustrated in the accompany drawings.

BRIEF DESCRIPTION OF DRAWINGS

FIG. 7, composed of FIGS. 7A through 7C, shows a source code example of a shopping page file containing the "cart" hidden file.

DETAILED DESCRIPTION OF PREFERRED EMBODIMENTS

The embodiments of the invention described herein are implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps or modules.

In accordance with the invention, users at remote terminals in a network, communicate through the network to a computer server and are able to build a list of software articles or items that the user wishes to download from the server to his client workstation. As this embodiment of the invention is described herein, a web browser program on a client station for browsing a network, such as the Internet, will be referred to as the browser, and the server workstation with which the browser station is communicating during a shopping transaction will be referred to as the server. Further, the browser will be sending requests in the form of data strings to the server and be receiving page files in return from the server. The articles or items, that the user is using the browser station to retrieve, will typically be software files such as device drivers. When the user completes selection of the items and requests download, then the server will be sending software files to the browser.

Figure 1:
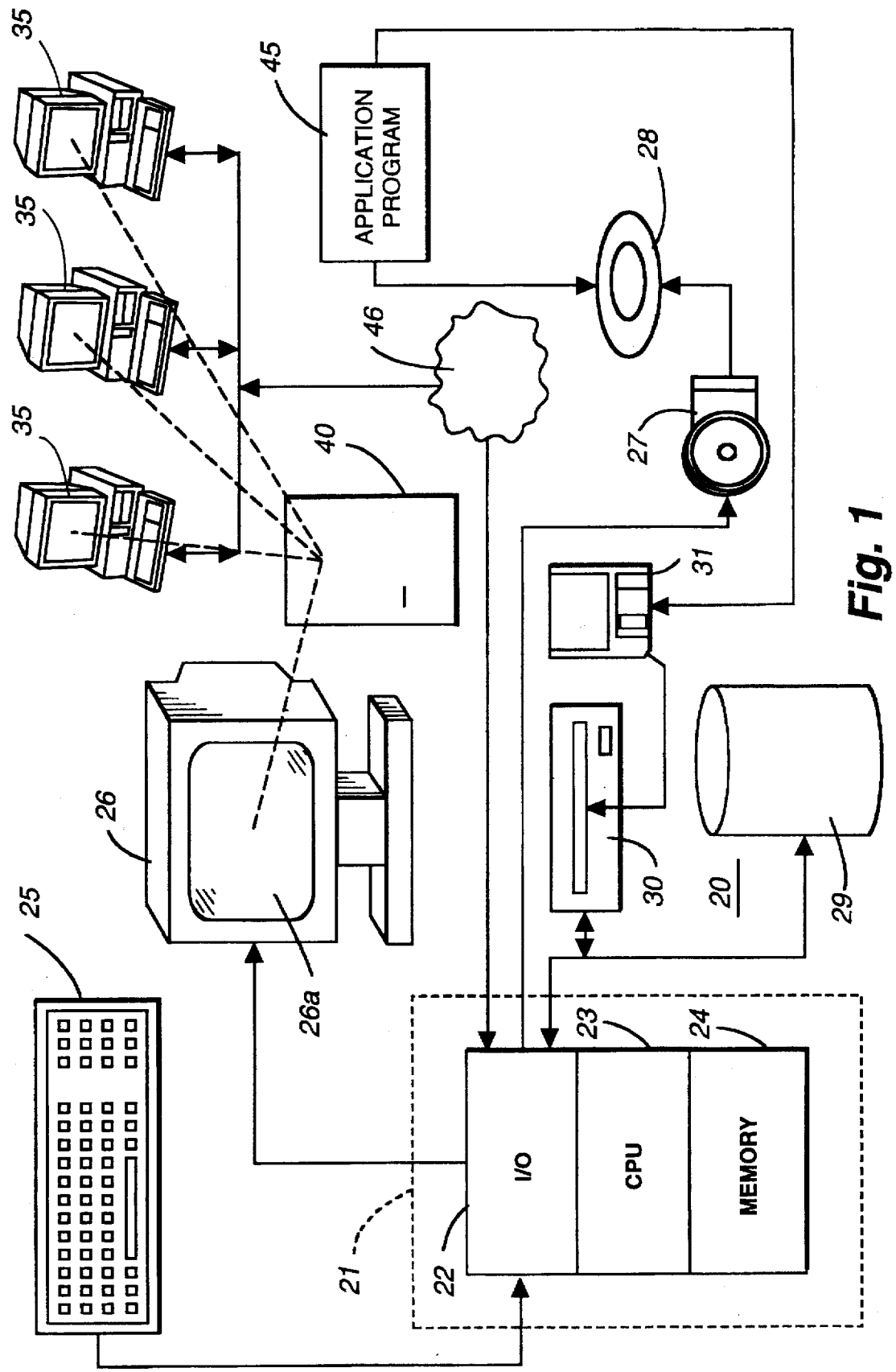
FIG. 1 illustrates a computing system having clients and a client server communicating in a communication network, such as Internet, to perform the logical operations of the invention.

To this end, and referring first to FIG. 1, the computing system 20, acting as a server through an application program 45, places at the remote user's command a plurality of pages 40 of information. These pages are originated by the application program 45 which is referred to hereinafter as the market program. Pages 40 are shopping pages produced by the market program at central processing unit (CPU) 23. CPU 23 generates the shopping page files and transmits them through the network 46 to the client stations 35, three of which are illustrated in FIG. 1. Shopping pages 40 built from the shopping page files contain items that are selectable by the user operator using the browser at a remote station 35.

In FIG. 1, processor 21 of computing system 20 includes an input/output section 22, a central processing unit 23, and a memory section 24. The input/output section 22 is connected to a keyboard 25, a display or monitor 26, and a disk storage unit 29 as well as an optical disk drive unit 27 for reading a cd-rom 28 and a floppy disk drive unit 30 for reading a diskette 31. Application program 45, or the market program as referred to herein, may be loaded into the computing system 20 from either the cd-rom 28 or diskette 31. The input/output unit 22 includes a communications adaptor communicating on the network 46 to the remote client stations containing the browser. Examples of computing systems that may be used as either a client-server 20 or a client 35 include the SPARC[1] ™ systems offered by Sun Microsystems™, Incorporated, personal computers offered by IBM Corporation and by other manufacturers of IBM compatible personal computers and systems running the UNIX[2], OS/2[3], AIX, DOS, etc. operating systems.

[1] SPARC is a trademark of Sun Microsystems, Inc.
[2] UNIX is a trademark Licensed by X/Open Company Ltd.
[3] OS/2 and AIX are trademarks of IBM Corporation.

Turning now to FIG. 2, logical operations to perform the preferred embodiment of the invention are shown. FIG. 2 is composed of FIGS. 2A through 2D indicating in each of these figures the logical operations performed by the browser on the left side of the figure and the logical operations performed by the server on the right side of the figure.

Figure 2A:
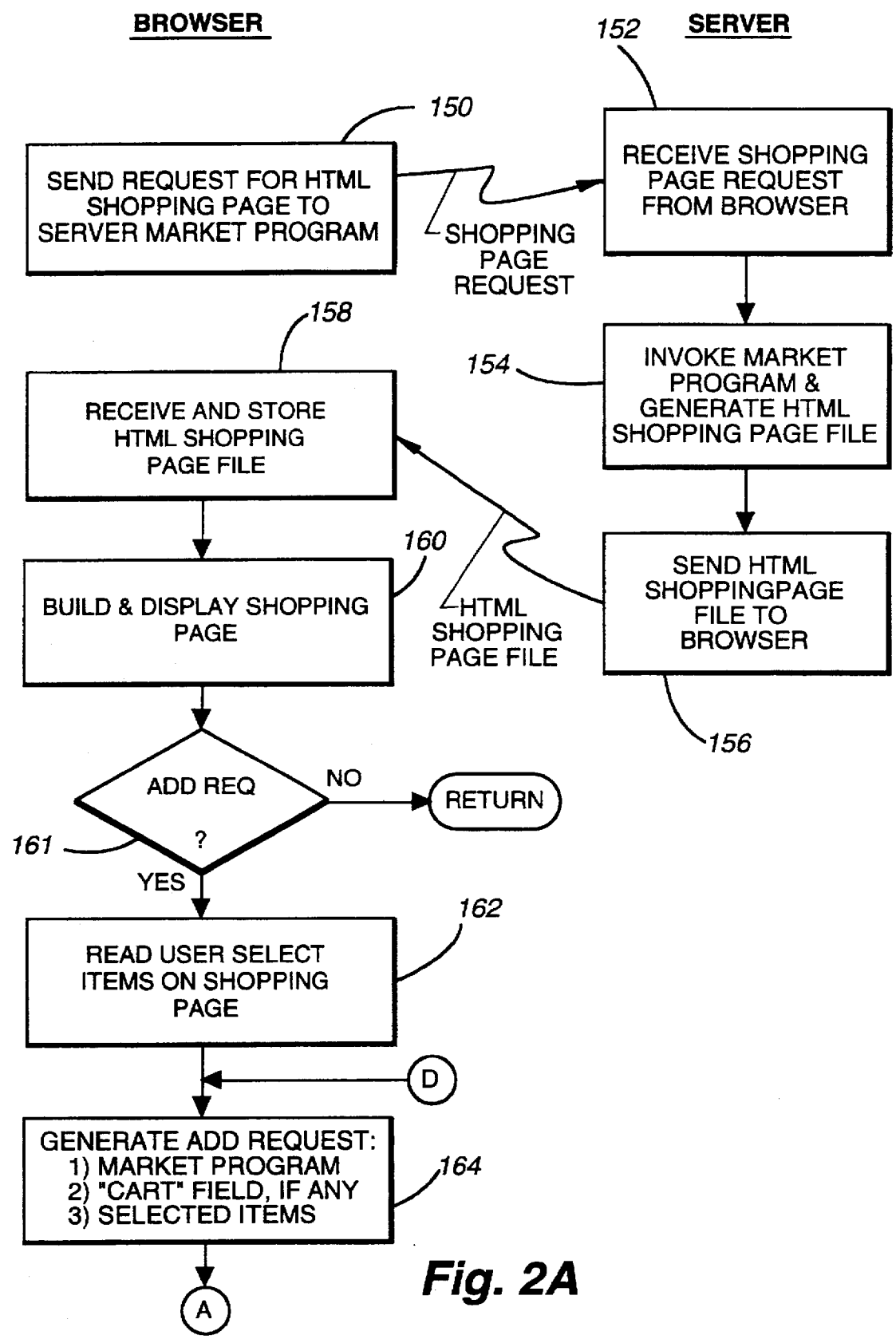
FIG. 2, composed of FIGS. 2A through 2G, illustrates the logical operations of a preferred embodiment of the invention.

In FIG. 2A, the shopping cart operation begins with a user using the browser at a client station to send a request for the HTML (Hyper Text Markup Language) shopping page to the server containing the market program. The request contains the address of the server and of the market program file at the server. In Internet protocol, this referred to as the uniform resource locator (URL). The user at the client station using the web browser program will enter in the URL space the desired locator string.

For example, the user might enter the following the string "http://gemini.west//dx/". In this string, "http:" indicates the string uses the hyper text transfer protocol. The first slash is a separator, and "/gemini.west/" is the location or node address of the server. The "dx" in the string is a directory which may be used along with other directories in the string to identify where a program file resides in the server. To request the market program, the user would type in the string after dx "/cgi-bin/ds.cgi". In this additional string "ds.cgi" is the market program file, and it is located in "cgi-bin". Operation 150 at the browser sends this shopping page request to invoke the market program at the server to send back a shopping page file.

In the server, the shopping page request is received by receiver operation 152. Operation 154 in the server invokes the market program identified by the filename in the request and generates the HTML shopping page file. Once the HTML shopping page file is built by the market program, operation 156 sends this HTML shopping page file to the browser that requested the shopping page.

Back at the browser, operation 158 receives and stores the HTML shopping page file. The shopping page files are stored at the browser to provide a history of pages through which the user may search if desired. In operation 160 this file is built and displayed on the monitor of the browser as a page.

Figure 3:
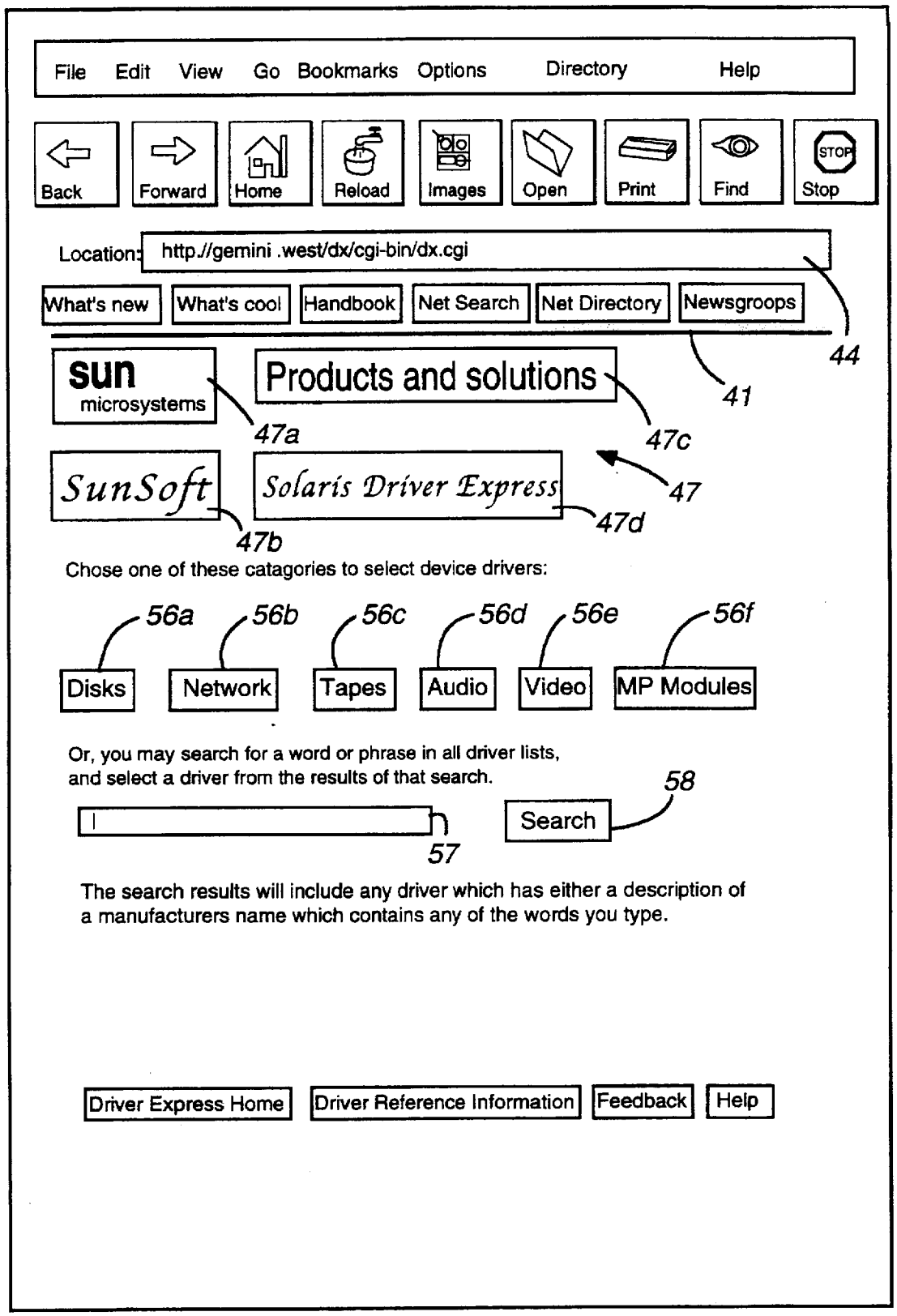
FIGS. 3–6 are enlarged views of a monitor at a client or browser station showing the shopping page and "cart" page along with browser control displays.

FIG. 3 is illustrative of the HTML shopping page produced from the shopping page file sent by the market program addressed in the shopping page request. Above line 41 in FIG. 3 are selectable icons associated with the browser program. The buttons illustrated in FIG. 3 are examples of display selectable icons provided by the Netscape™ web browser program. Other browser programs might be utilized at the remote client station. Note that the location field 44 indicates the uniform resource locator (URL) previously described in the example of a shopping page request sent by browser 150.

Below line 41 in FIG. 3 is the HTML page produced from the HTML shopping page file returned in response to the shopping page request. The icon "Sun Microsystems," 47A, if selected by the user will bring up the Sun Microsystems, Incorporated home page. Selecting icon SunSoft™, 47B, will bring up the home page for this subsidiary of Sun Microsystems. Similarly, selecting Products and Solutions, 47C, or Solaris™ Driver Express, 47D, will bring up the initial screens of those programs.

The shopping page illustrated in FIG. 3 allows the user customer to select one or more of the icons in row 56, labeled 56A through 56F. Each of the icons represents a category of device drivers, selected ones of which the user customer may wish to receive to update a device driver program or to load a device driver program to run a piece of hardware on the user's computer system. The user may select software drivers for disk devices, network devices, tape devices, audio devices, video devices or multiple processor modules. Alternatively, the user may enter a device name or number in the blank field 57 and conduct a search for software drivers in this manner. In either event, once the user has requested a list of drivers, another shopping page request will be sent to the server and the server will reply with the requested HTML shopping page file. Decision operation 161 detects a request other than an "add" request, i.e. add items to shopping cart. Since this is not an add request, and operation 161 returns the browser to operation 150 to send the request for the page with a list of drivers. Operations 152, 154 and 156 at the server respond with the requested shopping page file in the same manner as described above.

Figure 4:
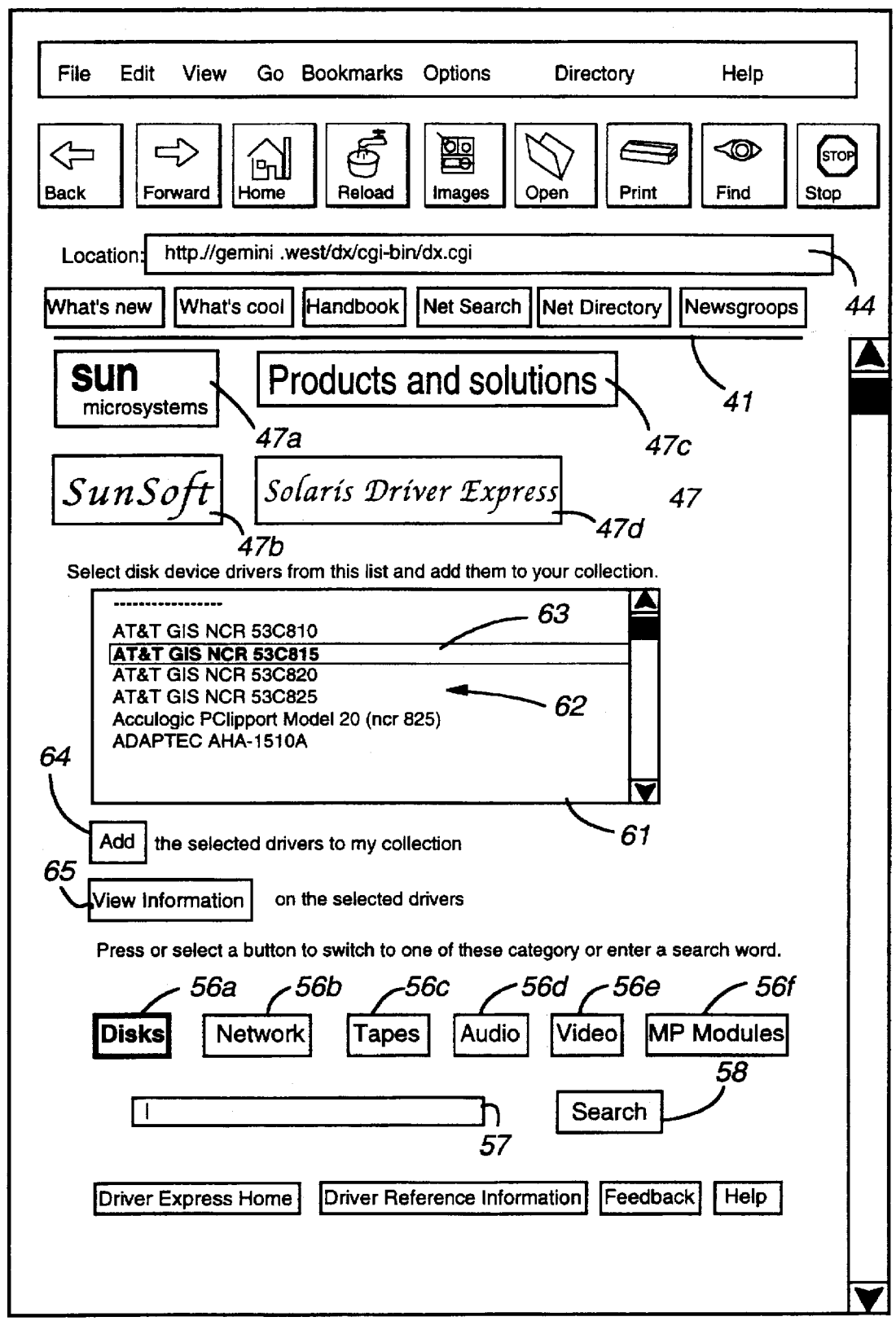

As shown in FIG. 4, the newly requested shopping page built from the current shopping page file includes a scrollable alphabetical listing 62 of disk device drivers. From this scrollable list, the user may select a disk device driver for his shopping cart. The user may select one or more items from the scrollable window 62. After making a selection the user adds the selected items to his shopping cart by selecting add icon 64. Alternatively, the user may view another page with additional information on the selected drivers by selecting view information icon 65. If the user's request is not an add request, decision operation 161 returns the process to the browser program to detect other user commands. If the user selects the add icon, decision operation 161 branches "Yes" to operation 162. Operation 162 then reads the user selected items on the shopping page, and operation 164 in the browser generates an add request. The add request is a data string including (1) an identification of the market program from which the user is selecting items, (2) a cart field in the shopping page file, if any, and (3) values identifying items just selected by the user which the user wishes to add to its HTML shopping cart, i.e. the cart field.

Figure 2B:
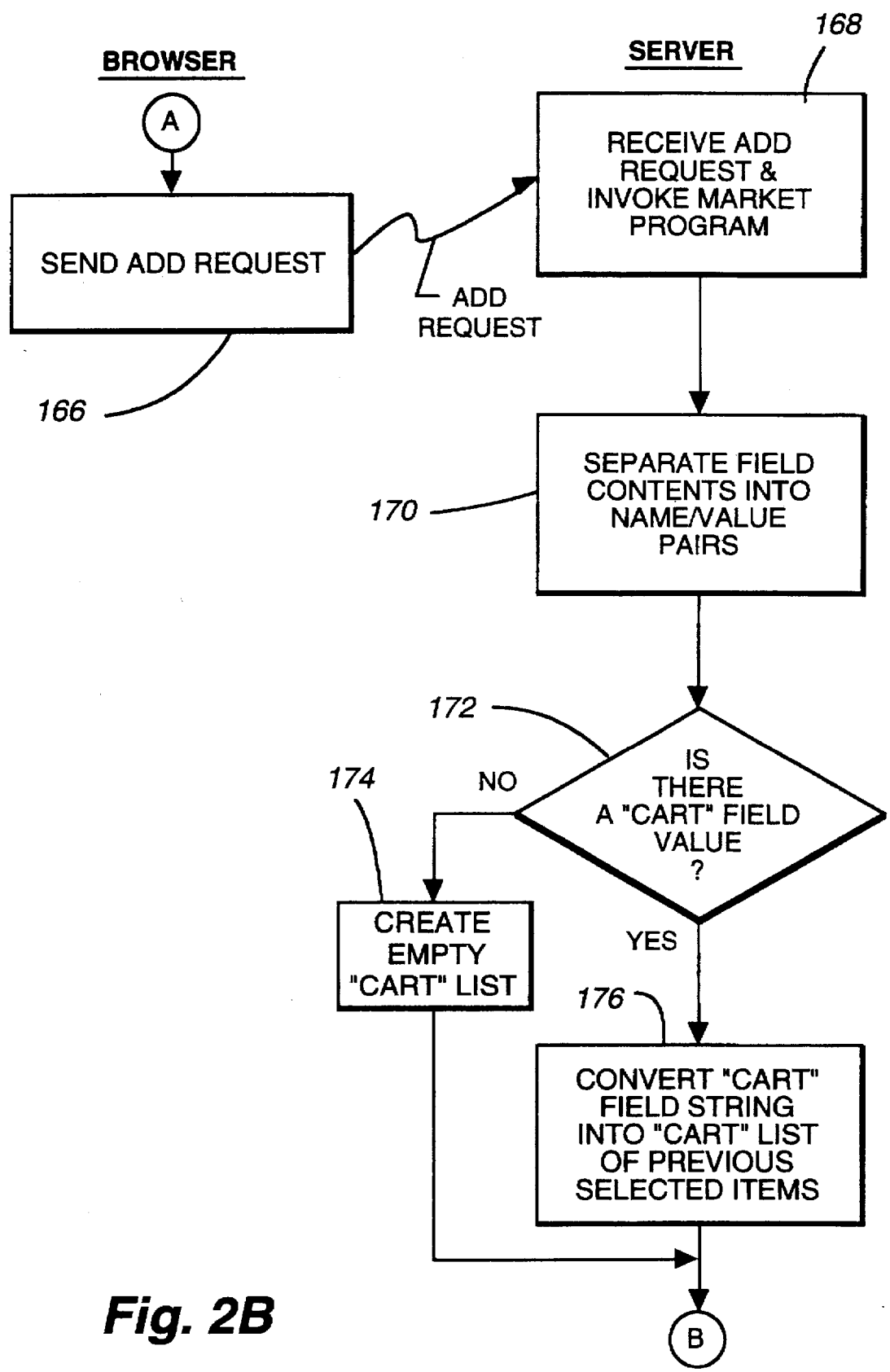

In FIG. 2B, the browser sends this add request data string to the server in operation 166. At the server, operation 168 receives the add request and invokes the market program in the add request. Operation 170 then separates the field contents in the add request into name value pairs. If there is a cart field in the add request containing previously selected items by the user at the browser, this name i.e. "cart", and value i.e. previous selected items, will be detected at decision operation 172.

Decision operation 172 if it does not find a cart field or does not find a value in the cart field will branch "No" to operation 174. Operation 174 will initialize an empty cart list at the server. In effect, the add request currently being processed in such a situation is a request containing the first choices made by the user at the browser, and there is no prior cart field in the add request. Accordingly, a cart list must be generated at the server and this operation is performed at step 174.

If there is a value in the cart field received in the add request, then the logical operations in the server branch to convert-to-list module 176. Module 176 converts the cart field string containing previous selected items into a cart list of previous selected items.

Figure 2C:
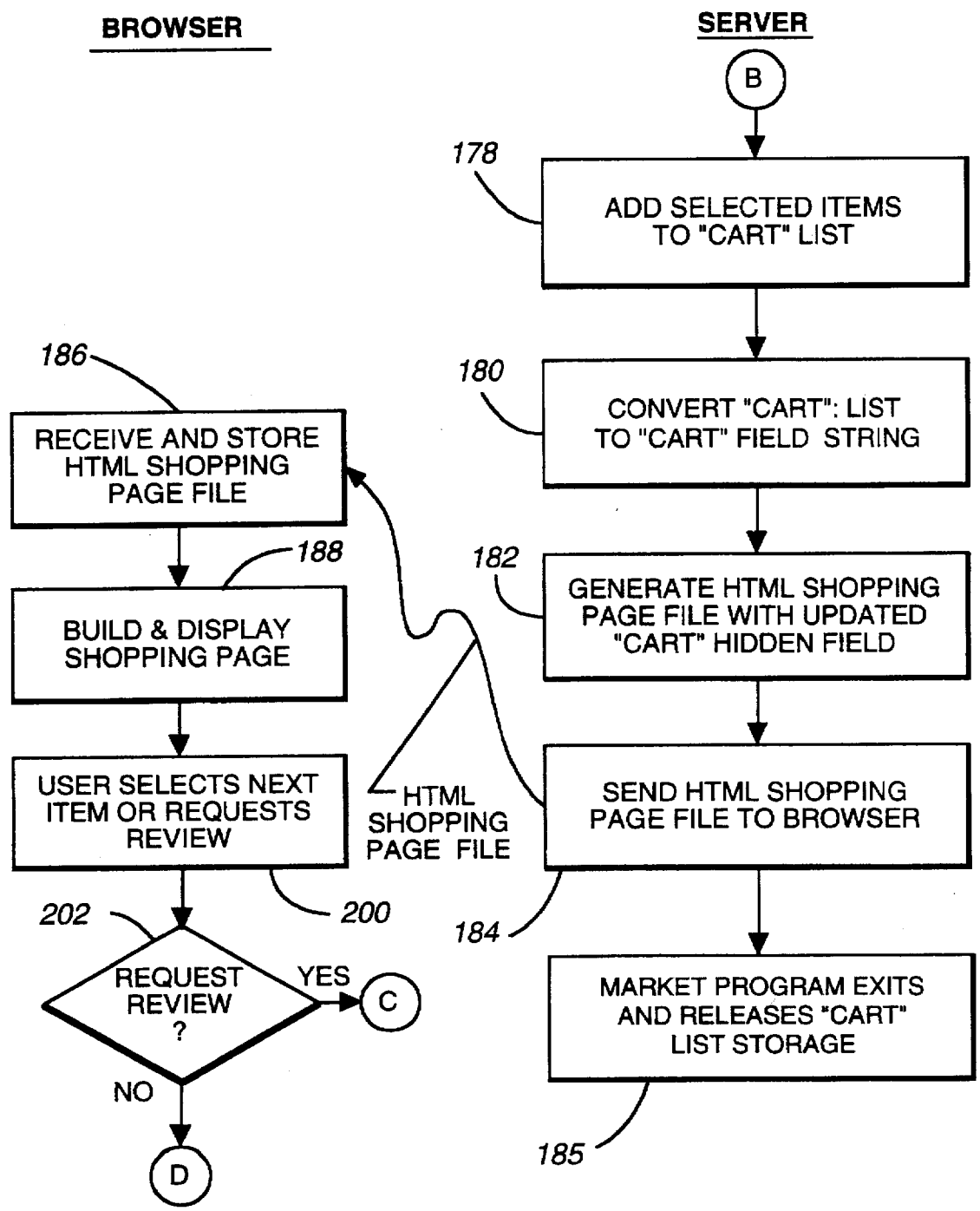

In FIG. 2C at operation 178, the server adds selected items just received in the current add request to the cart list produced either at operation 174 or operation 176. Since in our example this is the first collection of selected items in an add request, the cart list will come from operation 174. With the cart list updated to contain the currently selected items in the add request, convert-to-field module 180 converts the cart list at the server to a cart field data string. Operation 182 then generates the HTML shopping page file and inserts the cart field string into that file as a hidden field. Operation 184 sends this HTML shopping page file containing the hidden cart field to the browser. After the HTML shopping page file is sent, there is no need to maintain the cart list at the server. Therefore operation 184 releases the "cart" list temporary storage, and the market program exits.

At the browser, operation 186 receives and stores the HTML shopping page file containing the hidden field with the cart string of previously selected items. From this page file, operation 188 builds and displays the shopping page.

The cart list is not retained by the server. Previously selected items by the user are in the cart field string in the HTML shopping page file. So long as the user maintains the current shopping transaction, or stores the HTML shopping page file, the cart field with selected items is maintained at the browser or in communications between the browser and server.

In our example, it is assumed that the user in the first add request selected one item, a device driver for a disk device where the device driver is denoted by the identifier "AT&T GIS NCR 53C815." Accordingly, the HTML shopping page file received by the browser at operation 186 is in HTML code and looks like the file listed in FIG. 7 (composed of FIGS. 7A, 7B and 7C). Of course, any code consistent with the operating programs could be used. The listing in FIG. 7 is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Section 250 of the listing is an example of a list of selectable items that would appear in window 61 (FIG. 4 and FIG. 5).

The hidden cart field in FIG. 7 is at entry 252 (FIG. 7C) in the file. At entry 252, the hidden field indicates the name of the field is "cart," and the value in the cart field is "AT&T GIS NCR 53C815." In other words, the value is the device driver previously selected by the user.

Figure 5:
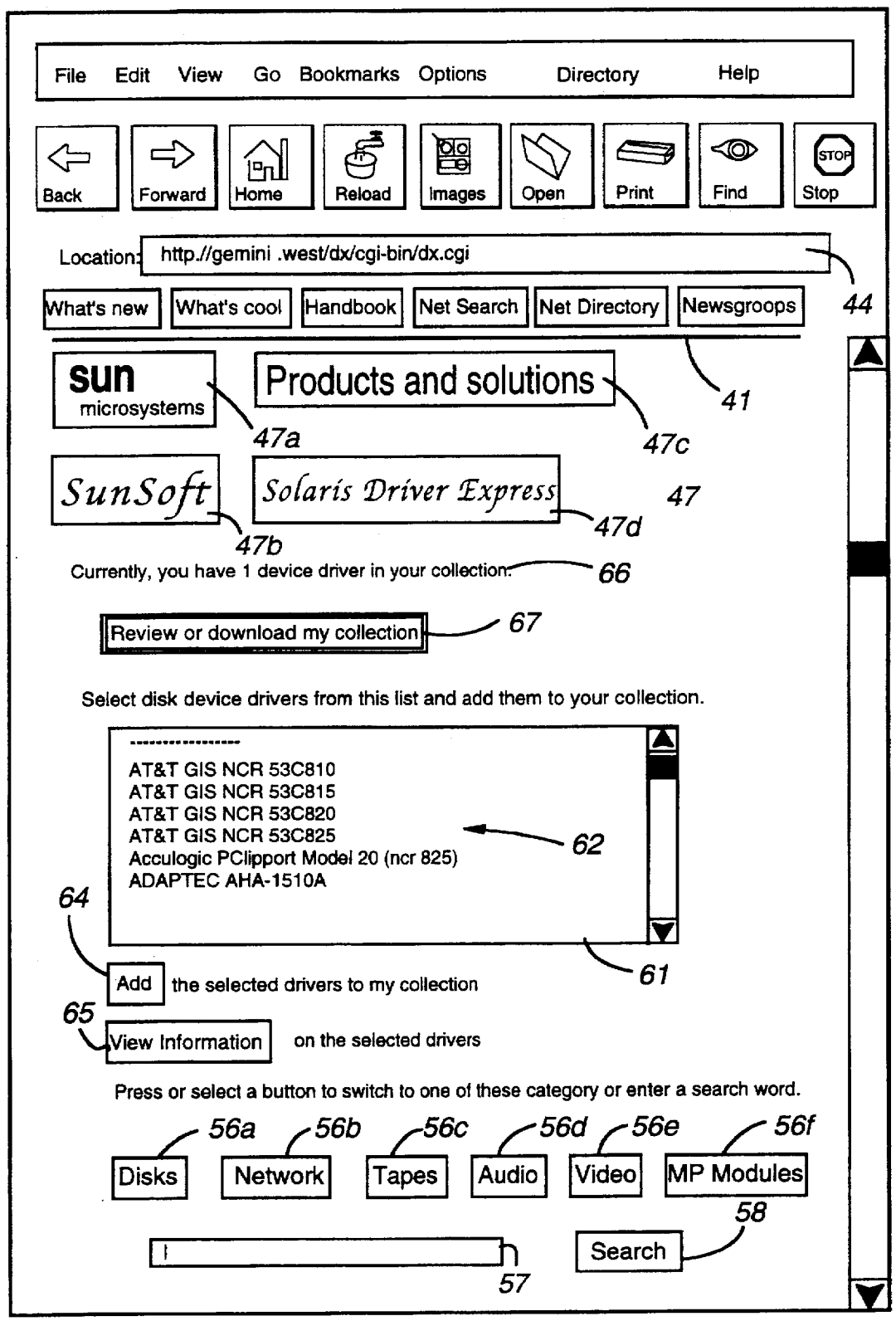

Operation 188 in the browser when it processes the shopping page file shown in FIG. 7 generates the page shown as FIG. 5 on the user's monitor at the client station. The user may now select additional items, may select another page with other device drivers or may make a review request by selecting icon 67, "Review or download my collection".

Assume that the user selects the network icon 56B. A request for the page containing network device driver selections would go out to the server. An HTML shopping page is returned to the browser from the server. The page is similar to that shown in FIG. 5 except the scrollable items in scrolling window 61 would be network software device drivers. If the user then at operation 200 in FIG. 2C were to select the add icon 64 after selecting a network device driver, decision operation 202 would detect that the request being received was not a review request and would branch the process to operation 164 in FIG. 2A to generate the add request. The browser and server would proceed as described above through operations 166 to 184 to add the selected network device drive to the cart field hidden in the shopping page file sent back to the browser in response to the add request.

Assuming that the user has shopped enough and wishes to review or download the selected collection of drivers, the user would select the icon 67, "Review or download my collection". In this instance, the process would branch yes at decision operation 202 to send review request operation 203 in FIG. 2D. This review request includes the "cart" field containing the list of selected items by the user and the market program identifier.

Figure 2D:
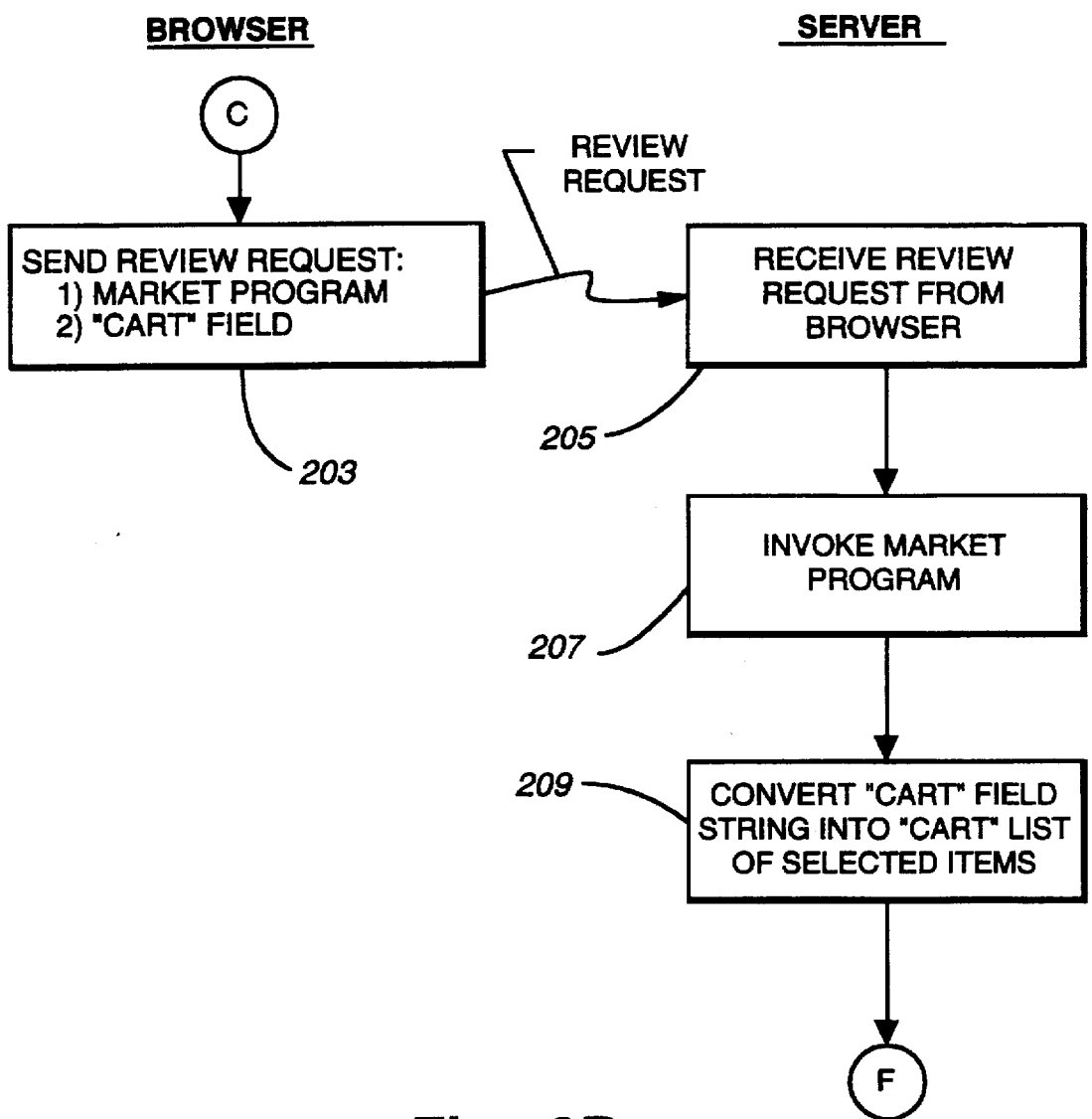

In FIG. 2D, the review request is received at operation 205 in the server. Operation 207 detects the market program identifier received in the review request and invokes the market program. Operation 209 converts the "cart" field in the review request to a "cart" list of selected items. At this point the server could add or delete items in the cart list; however in the review request there is no add or delete process so operation 211 in FIG. 2E converts the "cart" list back to the "cart" field.

Figure 2E:
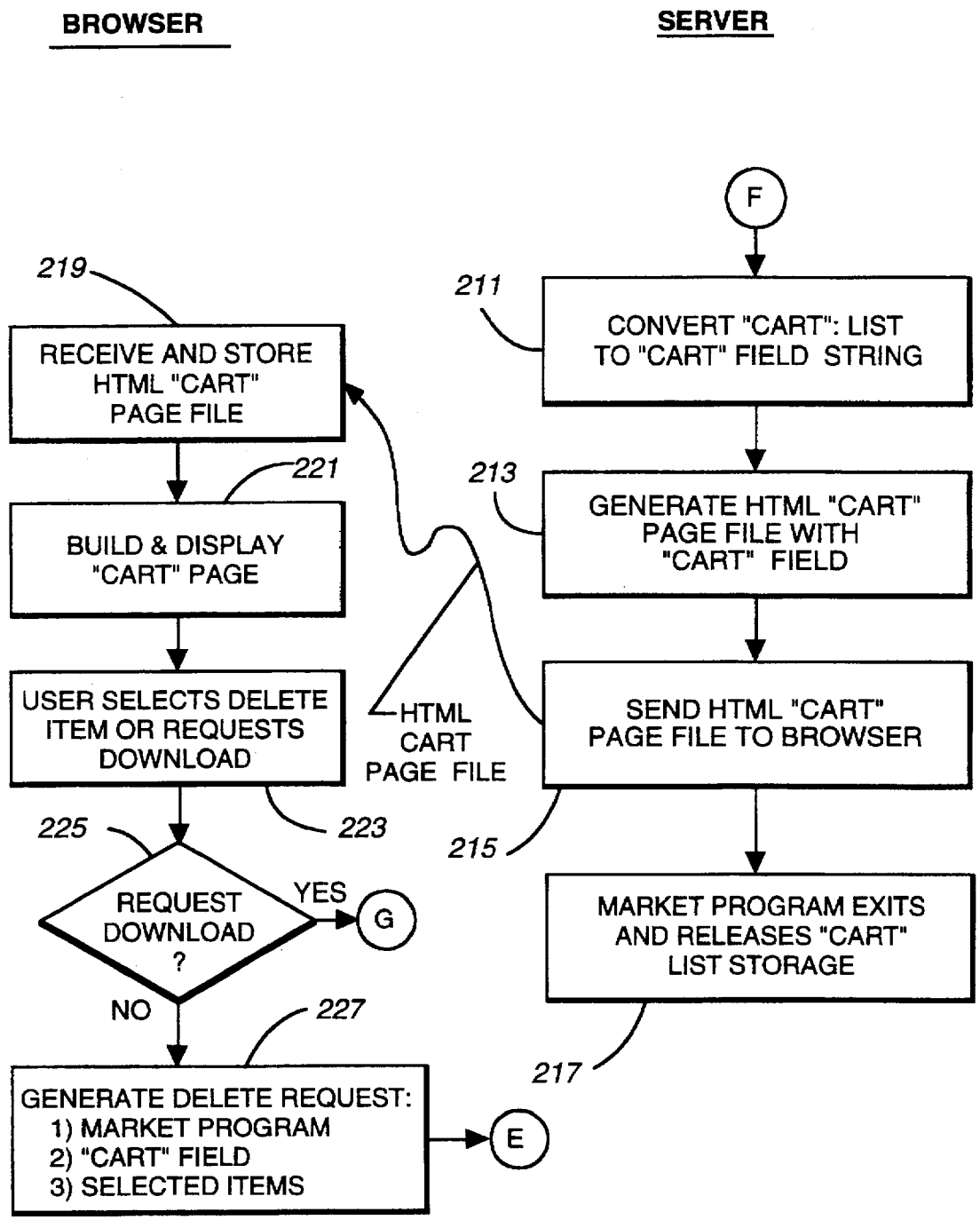

In FIG. 2E, operation 213 then generates a HTML cart page file and inserts the cart field string into that file. Operation 215 sends this HTML cart page file containing the cart field to the browser. After the HTML cart page file is sent, operation 217 releases the "cart" list temporary storage, and the market program exits.

Figure 6:
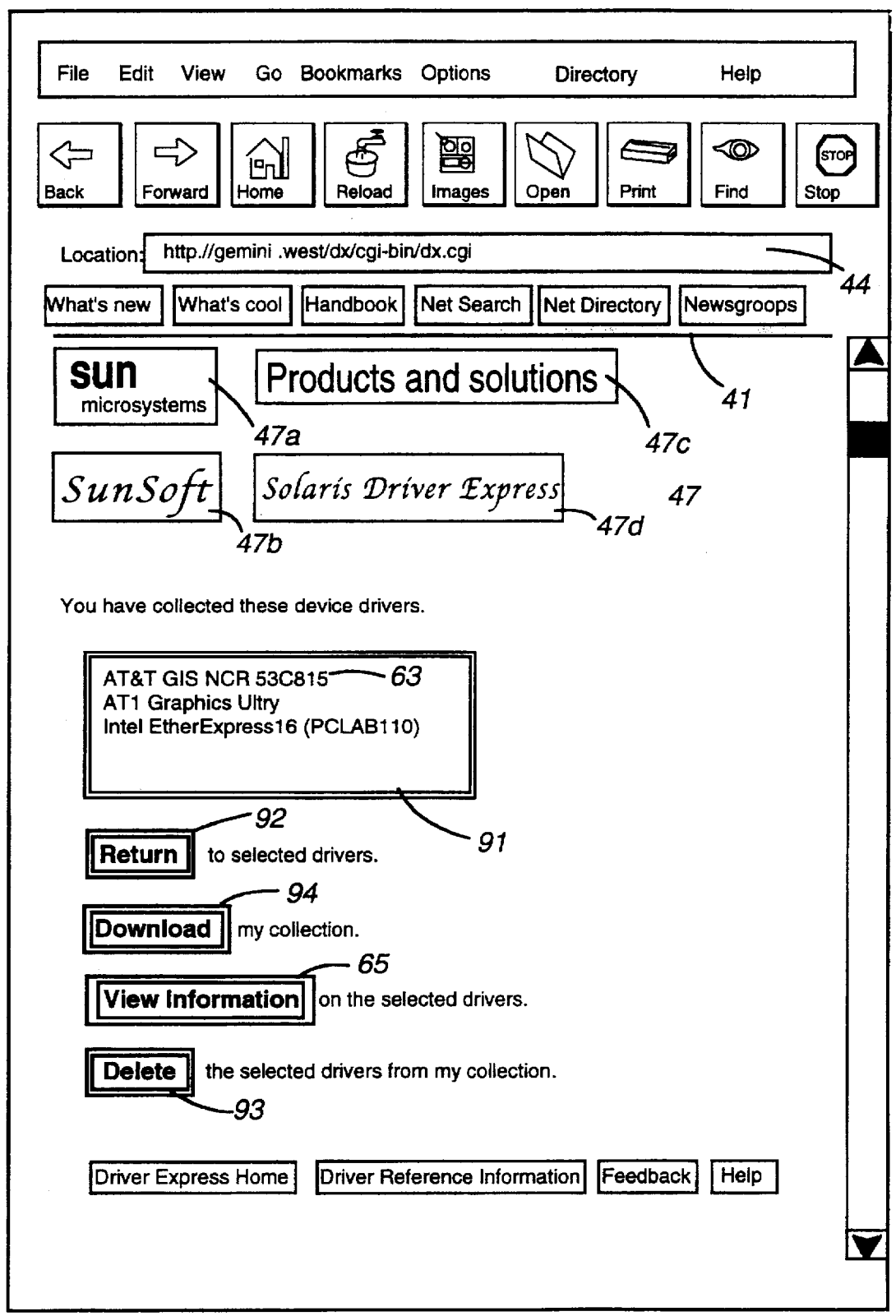

At the browser, operation 219 receives and stores the HTML cart page file containing the cart field with the string of collected items selected by the user. From this page file, operation 221 builds and displays the cart page. The cart page includes a window 91 containing the list of collected items selected by the user. The cart page is shown in FIG. 6. If the user selects a view information icon 65 in FIG. 6, then a request will go to the server to produce an HTML shopping page file with information about the selected items in the cart field. If the user wishes to delete one or more items from the collected items in window 91, the user selects the items to be deleted by highlighting them and then selects button 93.

In FIG. 2E, at operation 223 the user select a delete item in window 91 and then selects delete icon 93 as discussed above. Decision operation 225 tests whether the operation performed by the user was a delete request or a download request. Since the operation was a delete request, the process branches "No" to delete request generation module 227. Module 227 generates a delete request containing (1) the market program identifier, (2) the "cart" field of collected items and (3) the selected delete items to be deleted from the cart field.

Figure 2F:
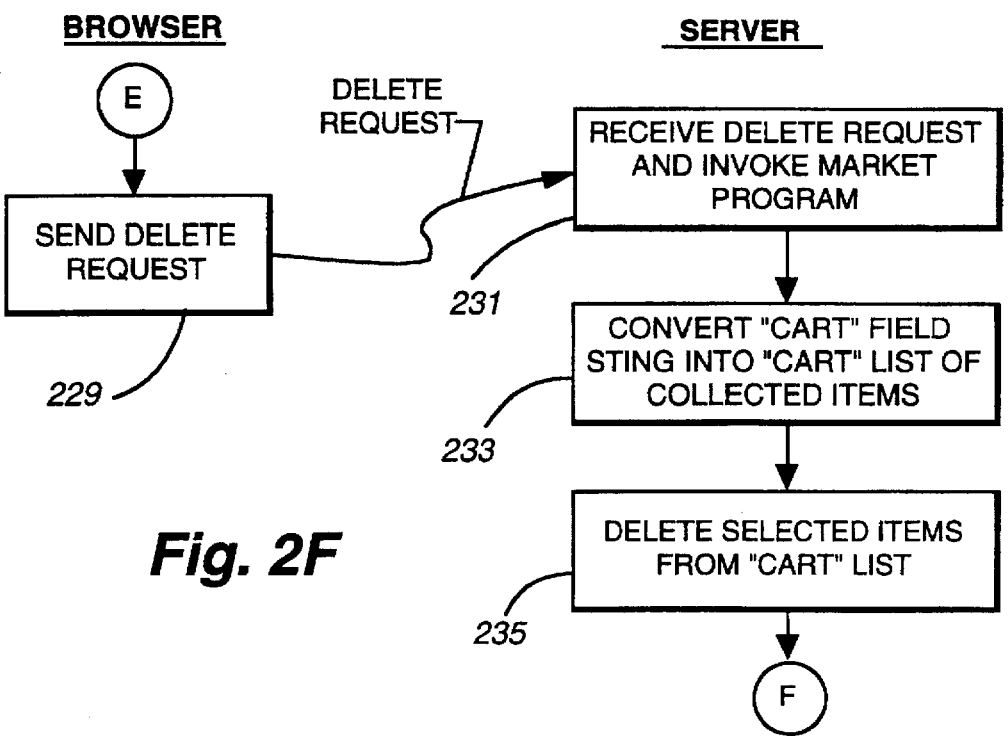

The delete request is sent by operation 229 in FIG. 2F from the browser to the server. At the server operation 231 receives the delete request and invokes the market program. Operation 233 then converts the cart field string in the delete request into a cart list of collected items previously selected by the user. Operation 225 reads the selected delete items in the delete request and deletes these selected delete items from the cart list.

The updated cart list is converted back to a cart list by operation 211 in FIG. 2E. The server again builds the cart page file at operation 213 and sends the cart page file with updated cart field at operation 215 back to the browser. Receive and store module 219 receives the cart page and stores it at the browser. Operation 221 again builds the cart page and displays the cart page with the updated listed of collected items, i.e. the previous list of collected items less the selected delete items just deleted. Assuming the user is now ready to download the remaining items in the shopping cart, the user at operation 223 in FIG. 2E selects download icon 94 (FIG. 6). Decision operation 225 detects the presence of a download request and the process branches to operation 204 in FIG. 2G.

Figure 2G:
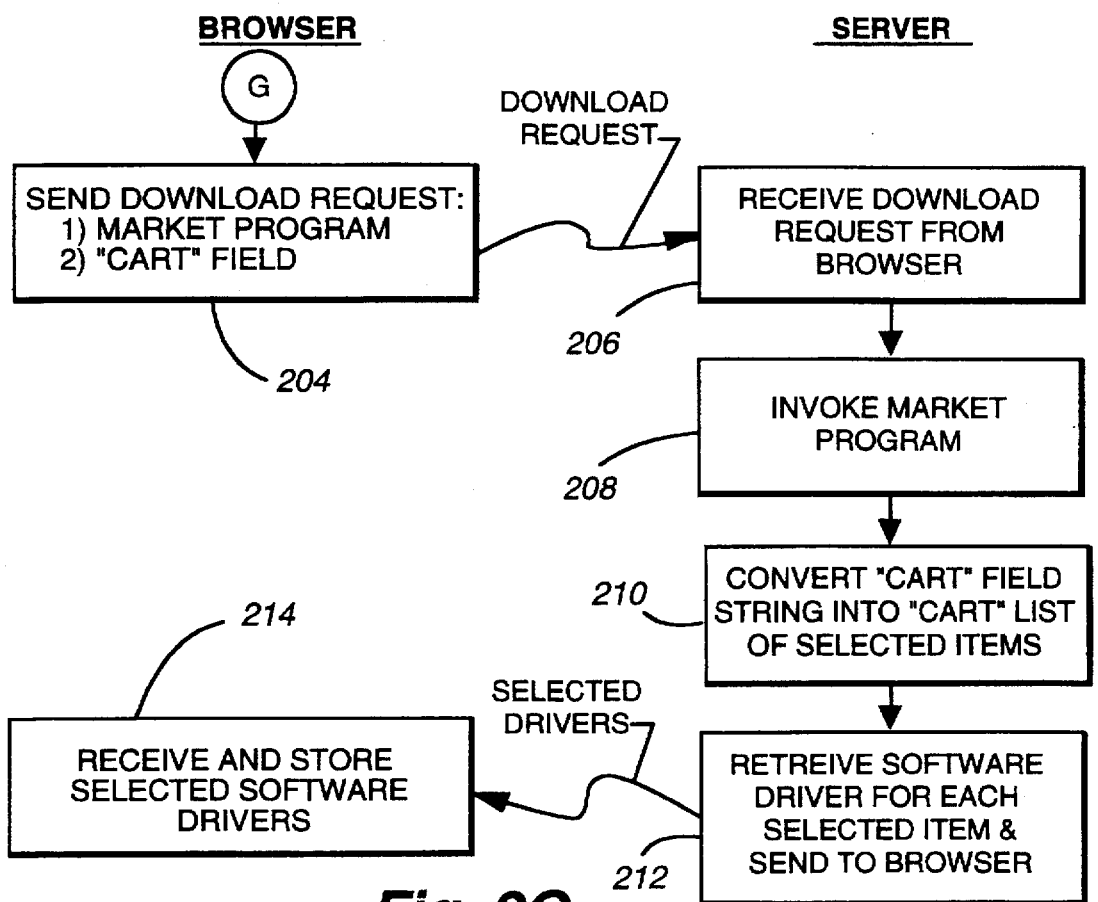

In FIG. 2G, operation 204 at the browser sends the download request to the server. The download request identifies the market program and thereby the server providing the market program and includes the cart field with the collection of selected items to be downloaded.

At the server, receive operation 206 receives the download request from the browser, and operation 208 invokes the market program identified in the download request. Conversion operation 210 at the server converts the cart field string into a cart list of selected items. Retrieve and send operation 212 then retrieves each of the device drivers identified as a selected item on the cart list and sends each identified device driver to the browser. At the browser, operation 214 receives the selected software device drivers and loads them into a storage device for use by the user.

During this shopping process, when a HTML shopping page file is received at the browser, this file is stored. The browser provides a facility whereby a history of HTML page files may be reviewed. This permits the user to browse to other pages not containing the cart field but at a later time to return to the page containing the cart field and resume shopping. Because the cart data, i.e. the selected items in the cart, are in the HTML shopping page file, the user can store that file for use at a later time. In this case, a later time might be another day when accessing the same server and market program over the Internet.

Thus, the present invention provides a method, apparatus and article of manufacture, a storage medium containing a computer program, for shopping on the Internet or any network in which all information necessary for meeting the user's item selections are kept in hidden fields in pages that may be retained by the user at the client station. The server need not retain any information about who the user was or what the user selected.

While the invention has been particularly shown and described with reference to a preferred embodiment thereof, it will be understood by those skilled in the art that various other changes in the form and details may be made therein without departing from the spirit and scope of the invention.

What is claimed is:

1. A method of supplying items on a network, the network having at least one computer-server for communicating with users employing a browser program on a terminal/computer at a location remote from said computer-server, said method comprising the steps of:

a) receiving, at the computer-server, a transmitted command from said browser program for a shopping page;

b) in response to said transmitted command, generating a shopping page file and transmitting the shopping page file to said browser program;

c) receiving, at the computer-server, at least one user selected item from the shopping page received by the browser program;

d) creating a list at the computer server;

e) at the computer server, adding to the list each user selected item received by said receiving step to provide an updated list;

f) returning from the computer server to said browser program the updated list of items; and g) receiving at the computer server from said browser program the list and a next selected item; and h) repeating steps (e), (f), and (g) to circulate said updated list between computer server and terminal/computer until termination of shopping by the the browser program.

2. A method of supplying items on a network in accordance with claim 1 further comprises the step of:

sending from the computer-server selected items to the terminal/computer in response to a command initiated by the browser program.

3. A method of supplying items on a network in accordance with claim 2 further comprises the step of:

at the computer server, deleting from the updated list a user selected item received by said receiving step (g).

4. A method of supplying items on a network in accordance with claim 1 wherein said user selected items identify computer programs, and including at the computer-server the steps of:

downloading, upon receipt of a command from the browser, computer programs identified by the user selected items.

5. A method of supplying items on a network in accordance with claim 1 wherein said receiving step (g) comprises the steps of:

separating fields received from the browser program into name/value pairs;

determining if there are any values in a "cart" field by examination of the "cart" field, and if so, converting said values into a list of previously selected items.

6. A method of supplying items on a network in accordance with claim 5 wherein said adding step (e) comprises the steps of:

updating the list of previously selected items with new selected items to provide said updated list; and converting said updated list to a cart field to be returned to the browser program by said returning step (f).

7. A method of user shopping on a network having at least one computer-server for interactively communicating with users employing browser programs on terminal/computers at locations remote from said computer-server, said method comprising the steps of:

transmitting a request from said browser program to said computer-server for a shopping page;

invoking a market application program at said computer-server in response to said request and generating and transmitting a shopping page file to said browser program;

building, by said browser program, from said shopping page file, a shopping page;

sending from said browser program to the computer-server for operation thereon by said market application program a request having a first field containing new selected items selected from the shopping page and, if there are previously selected items, a second field containing the previously selected items;

if said second field was sent by said sending step, generating a shopping list containing identification of items previously selected by said user, and if not, creating a shopping list;

adding new selected items from the first field to the shopping list;

returning the shopping list of items in a shopping field of a shopping page file to said browser program;

storing at least the shopping list by said browser program at a terminal computer; and continuing cyclical transmitting, invoking, building, receiving, and generating the shopping list and adding items to the shopping list and returning to and storing the shopping list at the terminal/computer until termination by the browser program.

8. A method of user shopping on a network in accordance with claim 7 wherein said determining, adding and returning steps comprise the steps of:

separating data strings in the first field and the second field into name/value pairs;

determining if there are any previous values in the second field, and if so, converting said previous values into said shopping list of previously selected items;

converting values in the first field to new selected items; adding the new selected items to said shopping list; and converting said shopping list to a field data string and then sending the field data string as the shopping field in a newly generated shopping page file.

9. A method of user shopping on a network in accordance with claim 7 further comprises the step of:

deleting a previous selected item from the shopping list.

10. A method of user shopping on a network in accordance with claim 7 wherein said items are software programs and said method further comprises the steps of:

retrieving the software programs identified as selected items in said shopping list; and after the retrieving step, downloading at least one of said software programs to said browser program.

11. Stateless shopping cart apparatus in a server computer for responding to requests from a browser system at a client station, the requests being directed to a stateless shopping cart market system in the server computer, the server computer having a processor, a keyboard, and a plurality of data storage devices, said processor having a central processing unit, memory and input/output control, said input/output control connected to the keyboard and data storage devices at the server computer and to the client station through a communication network, said apparatus comprising:

a receiver receiving an add request from the browser system, said add request identifying the market system and having a data string with a shopping cart field and a selected item to be added by the market system to the shopping cart field;

a cart list module initializing a shopping cart list or converting a shopping cart field in the add request to the shopping cart list;

an add module adding the selected item to the shopping cart list to provide an updated shopping cart list containing the selected item and any previous selected items from earlier add requests;

a shopping page module converting the updated shopping cart list to an updated version of the shopping cart field, generating a page file, embedding the updated version of the shopping cart field in the page file and sending the page file to the browser system for management of the shopping cart field at the client station whereby the user's shopping cart containing one or more user selected items is embodied in the shopping cart field in a page file that is controlled and stored by the browser system at the client station.

12. The apparatus of claim 11 wherein said cart list module comprises:

a decision module detecting the add request has no shopping cart field or a shopping cart field with no previously selected items and generating a first cart value;

a create module responsive to the first cart value initializing the cart list;

said decision module detecting the add request includes a shopping cart field with at least one previously selected item and generating a second cart value; and a convert-to-list module responsive to the second cart value converting the shopping cart field into the shopping cart list.

13. The apparatus of claim 11 wherein said shopping page module comprises:

a convert-to-field module converting the updated shopping cart list to the updated version of the shopping cart field;

a file generator generating the shopping page file and embedding the updated version of the shopping cart field in the shopping page file; and sending the shopping page file containing the updated version of the shopping cart field to the browser system.

14. The apparatus of claim 11 and in addition:

said cart list module at the server converting the shopping cart field of previously selected items from a download request to a shopping cart list of downloadable selected items; and a download module at the server retrieving each selected computer file identified by each of said downloadable selected items and sending the selected computer file to the browser system.

15. Apparatus for emulating a shopping cart metaphor on a network of server and client computing systems, said apparatus operating in a server and in a browser at a client station communicating with the server through the network, said browser generating requests to the server and the server responding with page files to the browser, said apparatus comprising:

a request module in the browser sending a shopping page request to the server;

a shopping page module in the server sending a shopping page file to the browser in response to the shopping page request, said shopping page file containing items selectable by a user using the browser;

a shopping module at the browser generating an add request and sending said add request to the server, said add request containing selected items from the items selectable in the shopping page file and a list of previously selected items, if any;

a cart list module initializing a shopping cart list if a list of previously selected items is not in the add request;

an add module at the server adding the selected items to the shopping cart list;

a shopping page module at the server converting the shopping cart list to a cart field, generating a new shopping page file, embedding the cart field in the new shopping page file and sending the new shopping page file to the browser;

said shopping module at the browser storing at least the shopping cart field received in the new shopping page field and sending a next add request to the server whereby the shopping cart field is managed by the browser at the client station.

16. The apparatus of claim 15 and in addition:

said shopping module at the browser generates a delete request and sends said delete request to the server, said delete request containing selected delete items from the previously selected items in the cart field;

said cart list module at the server converting the cart field of previously selected items to a cart list of previously selected items; and a delete module deleting the selected delete items in the delete request from the cart list so that the cart list contains previously selected items less the selected delete items.

17. The apparatus of claim 15 wherein said shopping page module comprises:

a convert-to-field module converting the cart list to the cart field;

a page file generator generating the shopping page file and embedding the cart field in the shopping page file; and sending the shopping page file to the browser system.

18. The apparatus of claim 15 and in addition:

said shopping module at the browser generates a download request and sends said download request to the server, said download request contains the cart field and thereby the previously selected items;

said cart list module at the server converting the cart field of previously selected items from the download request to a cart list of downloadable selected items;

a download module at the server retrieving each selected computer file identified from the cart list of downloadable selected items and sending the selected computer file driver to the browser; and said receiver at the browser receiving and storing each selected computer file.

19. A computer program storage medium readable by a computing system and encoding a computer program of instructions for executing a computer process in a server computer for responding to shopping requests from a browser system at a client station so that a shopping cart collection of items selected at the browser system is managed at the browser system rather than the server, said computer process comprising the steps of:

receiving an add request from the browser system, said add request identifying a market system at the server and having a shopping cart field and a selected item to be added by the market system to a shopping cart list;

converting a shopping cart field in the add request to the shopping cart list, adding the selected item to the shopping cart list to provide an updated cart list containing the selected item and any previous selected items from earlier add requests;

converting the updated cart list to an updated version of the shopping cart field;

generating a page file and embedding the updated version of the shopping cart field in the page file; and sending the page file to the browser system at the client station whereby the updated version of the shopping cart field in the page file is managed by the browser system at the client station.

20. The computer program storage medium of claim 19 wherein said computer process of the computer program further comprises the steps of:

storing the updated version of the shopping cart field at the client station; and said computer process step of converting the shopping cart list to the shopping cart field also releasing storage space used to store the shopping cart list at the server.

21. The computer program storage medium of claim 20 wherein said computer process of the computer program further comprises the steps of:

receiving a download request from the browser system, said download request identifying a market system at the server and having a shopping cart field of previously selected items;

converting the shopping cart field of previously selected items from a download request to a shopping cart list of downloadable selected items; and retrieving each selected computer file identified from the shopping cart list of downloadable selected items and sending the selected computer file to the browser system at the client.

* * * * *